(12) United States Patent
Umezawa et al.

(10) Patent No.: US 6,951,404 B2
(45) Date of Patent: Oct. 4, 2005

(54) ILLUMINATION KNOB AND METHOD OF MANUFACTURING KNOB

(75) Inventors: Shigeyoshi Umezawa, Fukui (JP); Yoshiyuki Nakade, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 52 days.

(21) Appl. No.: 10/706,702

(22) Filed: Nov. 12, 2003

(65) Prior Publication Data

US 2004/0136176 A1 Jul. 15, 2004

(30) Foreign Application Priority Data

Nov. 13, 2002 (JP) .................................... 2002-329431

(51) Int. Cl.⁷ .............................................. E05B 17/10
(52) U.S. Cl. ............................. 362/100; 362/26; 362/29
(58) Field of Search ......................... 362/26, 23, 28, 362/29, 100

(56) References Cited

U.S. PATENT DOCUMENTS

| 5,752,759 | A | * | 5/1998 | Pizzo | 362/26 |
| 6,293,685 | B1 | * | 9/2001 | Polkow | 362/253 |
| 2004/0070963 | A1 | * | 4/2004 | Miwa | 362/26 |

FOREIGN PATENT DOCUMENTS

JP            08-207622 A       8/1996

* cited by examiner

*Primary Examiner*—Ali Alavi
(74) *Attorney, Agent, or Firm*—RatnerPrestia

(57) ABSTRACT

A knob section includes an elastic pawl protruding downward and contacting an outer surface of a light guide unit at an inner surface of the pawl. A holder includes a holding section contacting an outer surface of the elastic pawl. An illumination knob is provided by latching a recess of the elastic pawl to a protrusion of the holding section. The elastic pawl is sandwiched between an outer surface of the light guide unit and the holding section, thus allowing constituent components of the illumination knob to be held securely.

4 Claims, 4 Drawing Sheets

ILLUMINATION KNOB AND METHOD OF MANUFACTURING KNOB

FIELD OF THE INVENTION

The present invention relates to an illumination knob used at a controlling panel of a vehicle and to a method of manufacturing the knob.

BACKGROUND OF THE INVENTION

Recently, as vehicles and various electronic apparatuses have been more functional and diversified, a switch provided on a control panel of each of them often has an illumination knob. For confirming and recognizing the position of the switch even in a dark, the illumination knob is illuminated by a luminous source provided in the control panel.

A conventional illumination knob will be described with reference to FIG. 4 through FIG. 5B.

FIG. 4 is a sectional view of the conventional illumination knob. Knob section 1 made of insulating resin has a pair of elastic pawls 1C formed at a lower surface of knob section 1. Pawls 1C protrude downward and have recesses 1B on respective inner surfaces of the pawls. Knob section 1 has opening 1A provided in its upper surface. Holder 2 has a substantially cylindrical shape and is made of insulating resin. Holder 2 has a pair of protrusions 2A formed on its outer surface, and the recesses 2A are latched on recesses 1B. Thus, holder 2 is attached at a lower section of knob section 1. Display section 3A of an upper end of light-transmittable light guide unit 3 is inserted into opening 1A of knob section 1. Light guide unit 3 has a pair of protrusions 3B provided at a lower end of unit 3, and the protrusions 3B are latched in holes 2B of a lower end of holder 2. Therefore, light guide unit 3 is accommodated and fixed in holder 2, thus providing the illumination knob.

FIGS. 5A and 5B are exploded sectional views of the conventional illumination knob. As shown in FIG. 5A, light guide unit 3 is inserted into holder 2 from underneath of holder 2 in a direction A. Then protrusions 3B at the lower end of light guide unit 3 are latched in holes 2B, thus combining holder 2 with light guide unit 3.

Next, as shown in FIG. 5B, holder 2 having light guide unit 3 inserted therein is inserted into knob section 1 from underneath section 1 in a direction B, and elastic pawls 1C elastically deforms in right and left directions. Then, recesses 1B are latched on protrusions 2A by elastic restoring force of elastic pawls 1C, thus combining holder 2 with the lower section of knob section 1 to provide the illumination knob.

This illumination knob is mounted at the switch provided on the control panel. When the luminous element, such as a light bulb or a light emitting diode, in the control panel emits light the light is transmitted through light guide unit 3 and illuminates display section 3A inserted into opening 1A. This structure allows the position of knob section 1 to be confirmed and recognized even in a dark.

In the conventional illumination knob, knob section 1 holds holder 2 and light guide unit 3 with elastic pawls 1C. When display section 3A of an upper surface of knob section 1 is pressed by strong force in a direction C, the force is transmitted from light guide unit 3 to holder 2. The force may make elastic pawls 1C open in right and left directions, thus unlatching protrusions 2A from recesses 1B. As a result, holder 2 and light guide unit 3 may be fallen from knob section 1.

To prevent the falling, it is necessary to applying adhesive to recesses 1B and protrusions 2A or welding elastic pawls 1C of knob section 1 to holder 2. These operations make the illumination knob need a long time to manufacture and be expensive.

Another conventional illumination knob is disclosed in Japanese Patent Laid-Open Publication 8-207622.

SUMMARY OF THE INVENTION

An illumination knob includes a knob section having an opening formed therein and including an elastic pawl protruding from a periphery of the opening, a holder having a through-hole formed therein which is linked to the opening, and a light-transmittable light guide unit accommodated in the through-hole of the holder. The knob section includes an elastic pawl protruding from a periphery of the opening. The holder includes a holding section provided at an inner surface of the through-hole. The holding section contacts a surface of the elastic pawl which is opposite to the opening, and is being latched to the elastic pawl. The light guide unit sandwiches the elastic pawl with the inner surface of the through-hole and contacting the elastic pawl.

The illumination knob includes components held securely, thus being manufactured easily and being inexpensive.

DESCRIPTION OF THE PREFERRED EMBODIMENT

Figure 1:
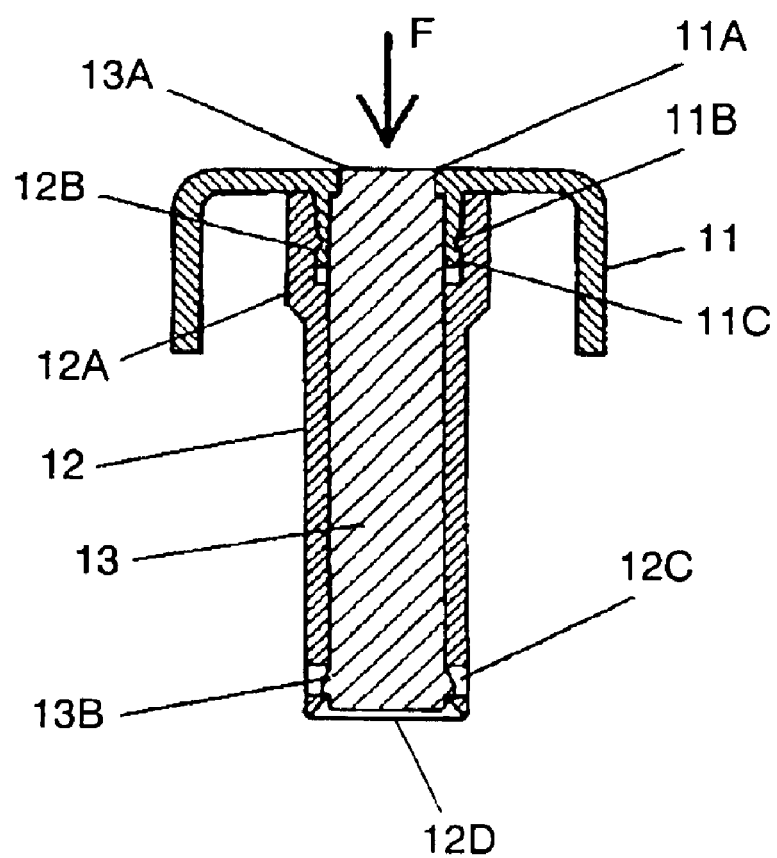
FIG. 1 is a sectional view of an illumination knob in accordance with an exemplary embodiment of the present invention.

FIG. 1 is a sectional view of an illumination knob in accordance with an exemplary embodiment of the present invention. A dark-colored knob section 11 made of insulating resin, such as ABS or polycarbonate, has opening 11A shaped in a mark, character or letter formed in an upper surface of knob section 11. A pair of elastic pawls 11C protruding downward are formed at a lower surface of knob section 11, and have recesses 11B in their outer surface. Holder 12 having through-hole 12D has in a substantially cylindrical shape or a U-shape made of resin, such as polyacetal or poly (butylene terephthalate). Hole 12D is linked to opening 11A. Holding section 12A provided at an inner surface of hole 12D of an upper end of holder 12 contacts an outer surface of elastic pawl 11C. A pair of protrusions 12B formed at inner surfaces of holding sections 12A are latched in recesses 11B at an outer surface of elastic pawls 11C, thus combining holder 12 with a lower section of knob section 11. Light-transmittable light guide unit 13 made of insulating resin, such as acrylic or polycarbonate, is inserted into hole 12D of holder 12. Display section 13A of an upper end of light guide unit 13 is inserted into opening 11A of knob section 11. A pair of protrusions 13B of a lower end of light guide unit 13 are latched in hole 12C of a lower end of holder 12, thus accommodating and latching light guide unit 13 in holder 12. A surface of light guide unit 13 contacts inner surfaces of elastic pawls 11C protruding downward from a lower surface of knob section 11. As described, Pawl 11C for holding holder 12 is sandwiched between the surface of light guide unit 13 and holding section 12A, thus providing the illumination knob.

Figure 2A:
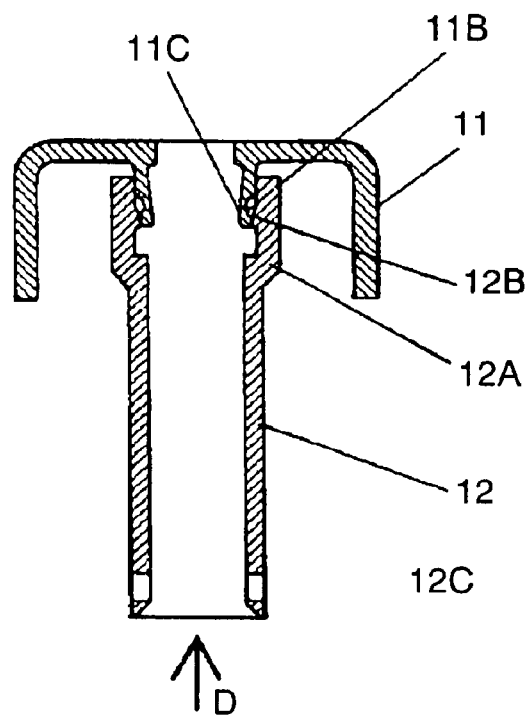
FIGS. 2A and 2B are exploded sectional views of the illumination knob in accordance with the embodiment.
Figure 2B:
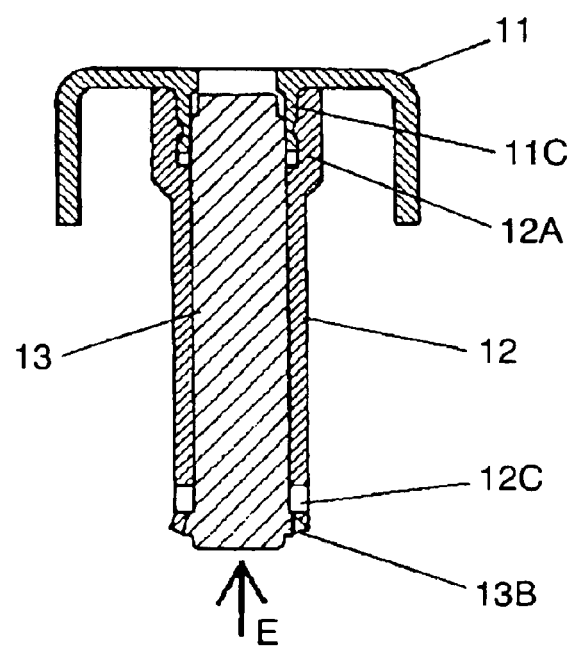

Next, a method of manufacturing the illumination knob will be described with reference to FIGS. 2A and 2B. FIGS. 2A and 2B are exploded sectional views of the illumination knob in accordance with the embodiment.

First, as shown in FIG. 2A, holder 12 is inserted into knob section 11 from underneath the section 11 in a direction D while allowing elastic pawls 11C to elastically deforms inside by holding sections 12A. Then, recesses 11B are latched on protrusions 12B by elastic restoring force of elastic pawls 11C, thus combining knob section 11 with holder 12.

Then, as shown in FIG. 2B, light guide unit 13 is inserted in hole 12D of holder 12 from underneath the holder 12 in a direction E. Elastic pawl 11C is sandwiched between an upper end of an outer surface of light guide unit 13 and holding sections 12A. Protrusions 13B at the lower end of light guide unit 13 are latched in holes 12C. Light guide unit 13 is accommodated and latched in holder 12, thus providing the illumination knob.

As shown in FIG. 1, even when force is applied to display section 13A at of an upper surface of knob section 11 in a direction F, elastic pawls 11C do not open in right and left directions. The reason is that elastic pawl 11C is sandwiched between the outer surface of light guide unit 13 and holding sections 12A. In a word, constituent components are securely held in the illumination knob and do not need to bond or weld, so that the illumination knob of the embodiment is manufactured easily and inexpensive.

Then, the illumination knob is mounted at a switch provided on a control panel. When a luminous element, such as a light bulb or a light emitting diode, in the control panel emits light, the light is transmitted through light guide unit 13 and illuminates display section 13A inserted into opening 11A. The structure discussed above allows the position of the knob to be confirmed and recognized even in a dark.

Figure 3:
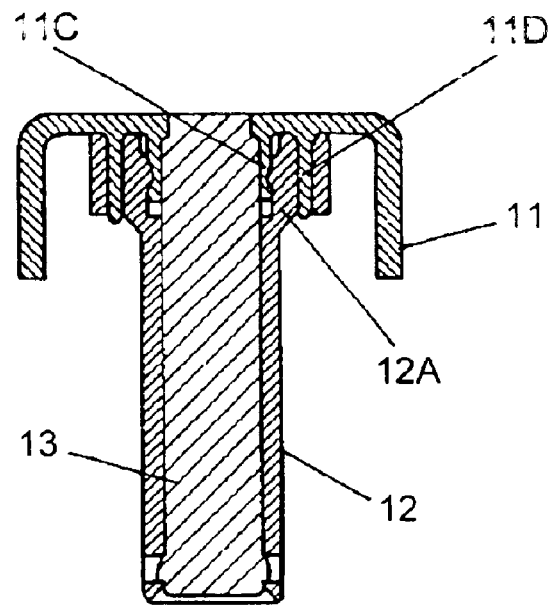
FIG. 3 is a sectional view of another illumination knob in accordance with the embodiment.
Figure 4:
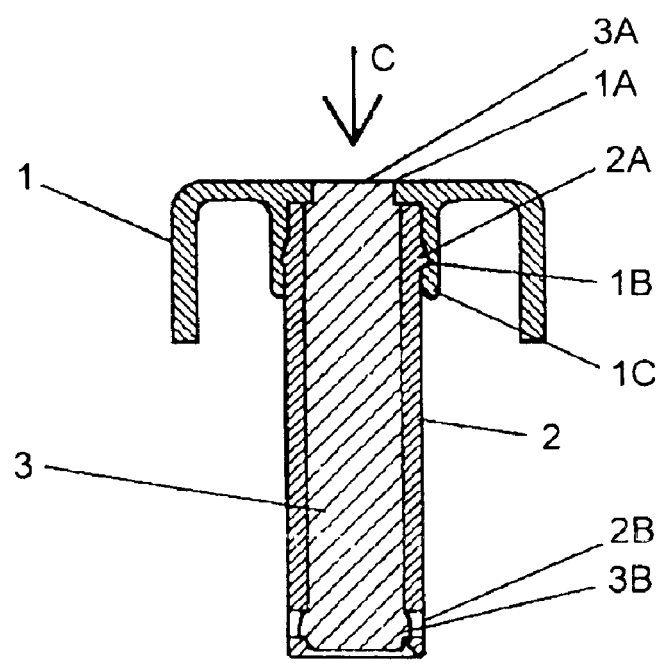
FIG. 4 is a sectional view of a conventional illumination knob.
Figure 5A:
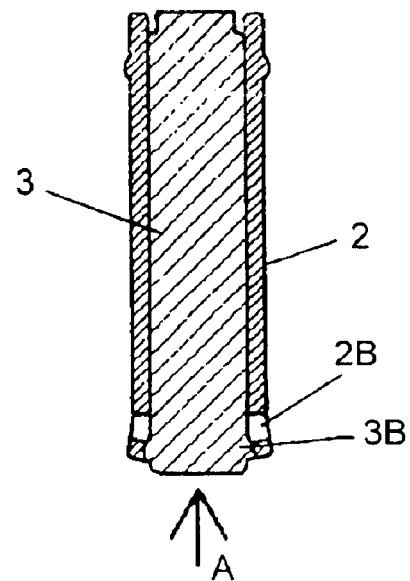
FIG. 5 is an exploded sectional view of the conventional illumination knob.
Figure 5B:
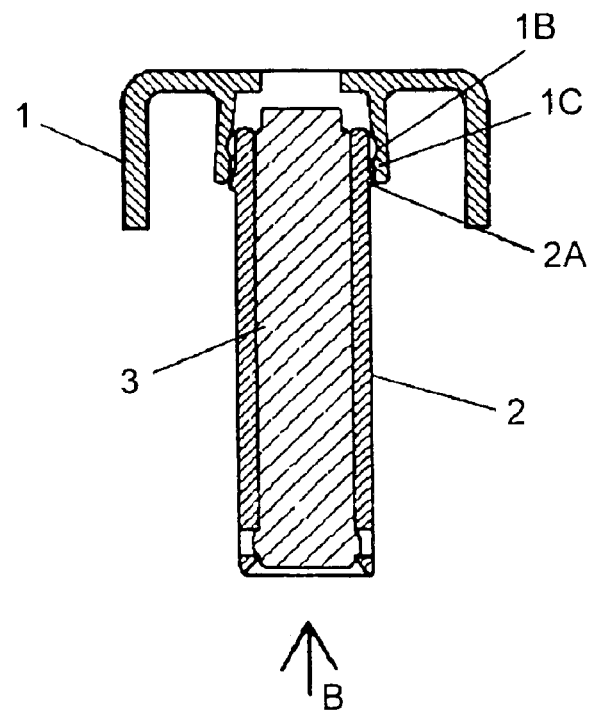

FIG. 3 is a sectional view of another illumination knob in accordance with the embodiment. In this illumination knob, extending section 11D is provided outside elastic pawl 11C of the lower surface of knob section 11, and protrudes downward. An inner surface of extending section 11D contacts an outer surface of holder 12, which is opposite to holding sections 12A. Extending section 11D prevents holding sections 12A of holder 12 from deforming, thus holding the constituent components more securely.

According to the embodiment, recess 11B is formed in the outer surface of elastic pawl 11C, and protrusion 12B is formed at the inner surfaces of holding sections 12A. However, a protrusion may be formed at the outer surface of elastic pawl 11C and a recess, which is latched on the protrusion, may be formed in the inner surfaces of holding sections 12A. This structure provides the same effect.

What is claimed is:

1. An illumination knob comprising:

a knob section having an opening formed therein and including an elastic pawl protruding from a periphery of said opening;

a holder having a through-hole formed therein, said through hole being linked to said opening, said holder including a holding section provided at an inner surface of said through-hole, said holding section contacting a surface of said elastic pawl which is opposite to said opening, said holding section being latched to said elastic pawl; and a light-transmittable light guide unit accommodated in said through-hole of said holder, said light guide unit sandwiching said elastic pawl with said inner surface of said through-hole and contacting said elastic pawl.

2. The illumination knob of claim 1, wherein one of said elastic pawl and said holding section has a protrusion, and other of said elastic pawl and said holding section has a recess formed therein and latched to said protrusion.

3. The illumination knob of claim 1, wherein said knob section further includes an extending section protruding from a position farther from said opening than said elastic pawl, said extending section contacting an outer surface of said holder.

4. A method of manufacturing an illumination knob, comprising the steps of:

preparing a knob section having an opening formed therein, the knob section including an elastic pawl protruding from a periphery of the opening;

preparing a holder having a through-hole formed therein, the holder including a holding section provided at an inner surface of the through-hole;

combining the holder with the knob section so that a surface of the elastic pawl which is opposite to the opening contacts the holding section; and inserting a light-transmittable light guide unit into the through-hole of the holder so that the elastic pawl is sandwiched between a surface of the light guide unit and the holding section.

* * * * *